April 5, 1966 R. GRAF 3,244,952
EXPLOSION-PROOF ELECTRICAL CAPACITOR WITH RUPTURE CUTOUT
Filed Aug. 22, 1963 2 Sheets-Sheet 1

April 5, 1966     R. GRAF     3,244,952

EXPLOSION-PROOF ELECTRICAL CAPACITOR WITH RUPTURE CUTOUT

Filed Aug. 22, 1963     2 Sheets-Sheet 2

United States Patent Office 3,244,952
Patented Apr. 5, 1966

3,244,952
EXPLOSION-PROOF ELECTRICAL CAPACITOR WITH RUPTURE CUTOUT
Richard Graf, Berlin-Charlottenburg, Germany, assignor to Siemens & Halske Aktiengesellschaft, Berlin and Munich, Germany, a German corporation
Filed Aug. 22, 1963, Ser. No. 303,840
Claims priority, application Germany, Aug. 30, 1962, S 81,175
3 Claims. (Cl. 317—256)

The present invention relates to an explosion-proof electrical capacitor with a rupturable cutout element which is actuated by a change in shape of the capacitor housing as the result of the generation of gas therein.

It is known to provide capacitors with automatic cutouts in the housing which, in case of an operational failure of the capacitor, disconnect the latter responsive to the generation of gas therein.

To prevent the capacitor housing from opening incident to the actuation of the automatic cutout, thus making it possible for an impregnating agent to run out, it is advantageous to provide in the housing one or more inwardly disposed corrugations, extending transversely to the longitudinal axis of the housing, which corrugations expand upon sufficient generation of gas in the housing, in response to which the automatic cutout is actuated. If, in the case of a capacitor provided with such an automatic cutout, sufficient generation of gas takes place in the housing, a pressure will be exerted on the inner wall of the capacitor housing which pressure will be transmitted in the form of an expansion force on the corrugations provided therein, causing the housing to expand and resulting in an enlargement of the distance between certain parts of the housing, for instance, between the bottom of the housing and the cover member therefor, to effect a rupturing of the rupturable cutout element. The generation of gas is thereby stopped and an escape of the impregnating agent is avoided, the rupture of the cutout element eliminating any possibility of damage to the capacitor, as well as any further damage which might result from an explosion of the capacitor.

However, there are also cases where capacitors are used in circuits in which the sudden disconnecting of the capacitor leads to further disturbances and possibly to damage of other elements in the particular circuit. As one of such circuits may be mentioned, for example, a circuit for a single phase A.C. motor in which a capacitor is used for the shifting of the phase for the auxiliary phase winding. If, in this case, the capacitor is suddenly disconnected during the operation of the motor, the motor will stop and thus draw a very high current, which in a short time could lead to the burning out of the motor.

In order to avoid any possibility of such damage to a motor, it is in accordance with the present invention proposed to extend to the exterior both leads of the rupturable cutout element of the explosion-proof capacitor. It then is readily possible to install the rupturable cutout element at such a point in the electrical circuit, that upon the occurrence of excessive pressure in the capacitor housing, not only the capacitor, but the entire endangered circuit will be disconnected. Depending on the nature of the circuit in which the capacitor is installed, it may be advantageous to extend both connecting leads of the cutout element exteriorly of the housing, insulated from the capacitor connecting leads, or to internally connect one capacitor lead with one lead of the cutout element within the capacitor and extend a common connecting lead wire from the junction point thereof to the exterior.

It will be desirable in given cases to have, in addition to the one rupturable cutout element, additional rupturable cutout elements. For this purpose there can be provided in the housing alongside of the first cutout element, additional rupturable cutout elements which operate in the same manner. It is in some cases advantageous not to actuate the individual cutout elements simultaneously, but rather in a given predetermined sequence. A person skilled in the art may readily dispose the different rupturable cutout elements to effect successive rupturing of the cutout elements in desired sequence.

In the drawings wherein like reference numerals indicate like or corresponding parts:

Figure 1:
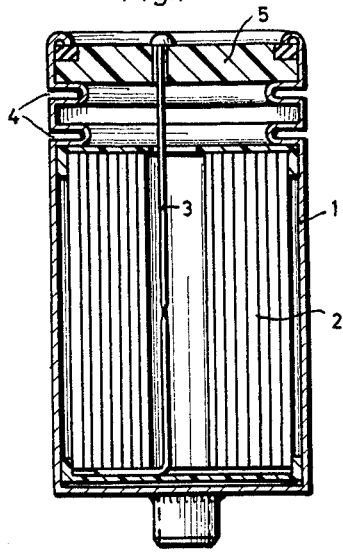
FIG. 1 is a sectional view of a capacitor embodying the invention in which the rupturable cutout element is disposed in a capacitor connecting lead.

Refering to FIG. 1, the reference numeral 1 designates a capacitor housing, in which is arranged a capacitor structure 2, for example, a wrapped regenerative capacitor. In the upper part of the housing there are provided corrugations 4 which permit a lengthening of the housing in the event excessive pressure is built up within the housing. The housing is closed off by a cover plate 5, the rupturable cutout element 3 extending from the cover to the opposite end of the housing.

Figure 2:
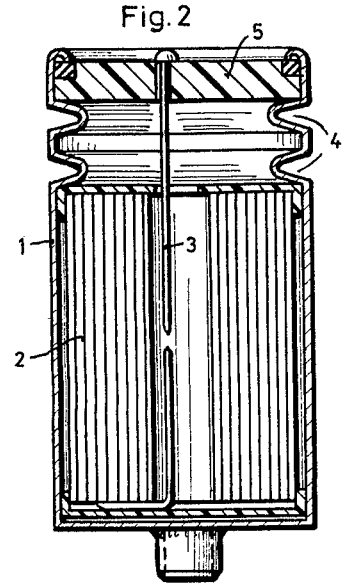
FIG. 2 is a view similar to FIG. 1 following expansion of the housing and rupture of the cutout element.

FIG. 2 illustrates the same capacitor after a lengthening of the capacitor housing 1 and an expansion of the corrugations 4 has taken place, as a result of the generation of excesive pressure in the capacitor housing 1, whereby the cutout element 3 has ruptured.

Figure 3:
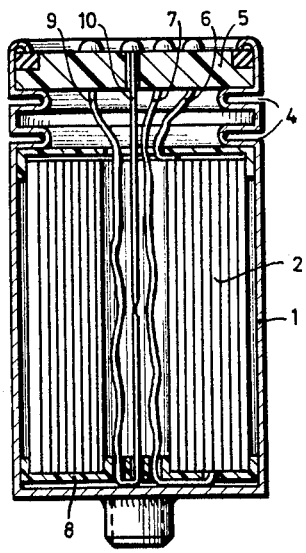
FIG. 3 is a sectional view similar to FIGS. 1 and 2 illustrating both connecting leads of the rupturable cutout element being brought out to the housing exterior.

In FIG. 3 there is shown an electrical capacitor in which both of the connecting leads 9 and 10 of the rupturable cutout element are extended to the housing exterior. The cutout element is in this case supported at the end of the capacitor opposite to the cover plate 5 by a supporting plate 8 in order to insure proper tensioning and rupturing of the cutout element. The leads 6 and 7 of the capacitor structure are in this case connected directly with the capacitor without the interposition of a rupturable cutout element.

Figure 4:
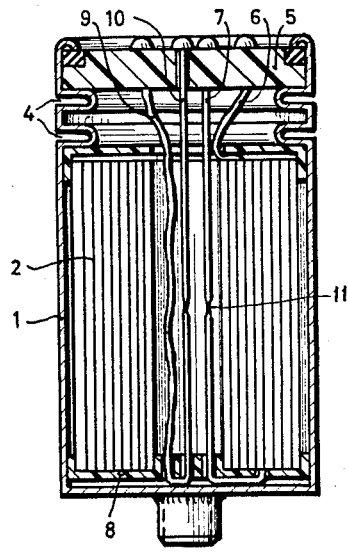
FIG. 4 is a sectional view, similar to the preceding figures, illustrating the use of a rupturable cutout element as illustrated in FIG. 3, and a similar cutout element in one of the capacitor connecting leads.

In FIG. 4 a further embodiment of the invention is shown in which another rupturable cutout element, corresponding to the element 3, is arranged in the capacitor housing alongside the first rupturable cutout element. In the example shown, the additional cutout element is connected between the lead 7 of the capacitor and the plates contacted at the lower end of the capacitor. However, it is also possible to similarly extend both connecting leads of the rupturable cutout element 11 to the housing exterior.

Figure 5:
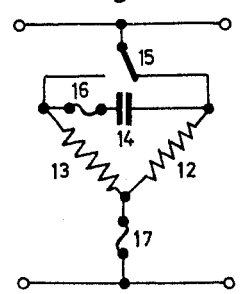
FIG. 5 is a diagrammatic figure of a circuit embodying a capacitor constructed in accordance with the invention.

In FIG. 5 there is shown an arrangement of a capacitor, constructed in accordance with the invention, as a starting and operating capacitor of a single phase A.C. motor. In this figure, numerals 12 and 13 indicate the windings of the single phase A.C. motor, 14 is the starting capacitor, and 15 is a switch which serves to reverse the direction of rotation of the motor. The rupturable cutout element 17 is inserted in a line connecting the single phase A.C. motor with the power source. This may be accomplished by use of a capacitor, such as shown in FIG. 3, as a starting and running capacitor 14. The rupturable cutout element 3, having the leads 9 and 10, is then comparable to the rupturable cutout element 17. In addition there can also be provided in the capacitor circuit another rupturable cutout element 16, corresponding, for example, to the rupturable cutout element 11 shown in FIG. 4. The use of the additional cutout element 16, gives assurance that a flow of current in the capacitor 14 is definitely avoided even if the windings 12 and 13 become grounded.

In given cases, one lead of the rupturable cutout element can be connected with one of the capacitor leads. The connection can then be made within the capacitor housing whereby only three connecting terminals are required on the housing cover, rather than four. Such embodiment is shown in FIG. 6, which otherwise corresponds to the embodiment of FIG. 3, but with the lead 9 of the rupturable cutout element being operatively connected with the lead 7 of the capacitor 2 within the capacitor housing 1, whereby the second outlet lead of the rupturable cutout element is dispensed with.

Figure 7:
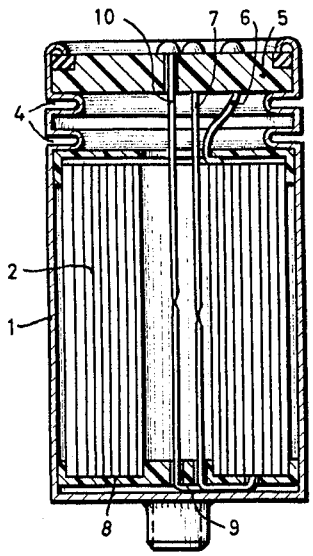
FIG. 7 is a sectional view similar to FIG. 6 with a further cutout element disposed in the common connecting lead from the first cutout element and the capacitor.

In similar manner, FIG. 7 shows an embodiment, otherwise corresponding to FIG. 4, in which the lead 9 of the rupturable cutout element is operatively connected with the lead 7 of the capacitor 2 within the housing 1, and the lead 7 also provided with a rupturable cutout element.

Figure 6:
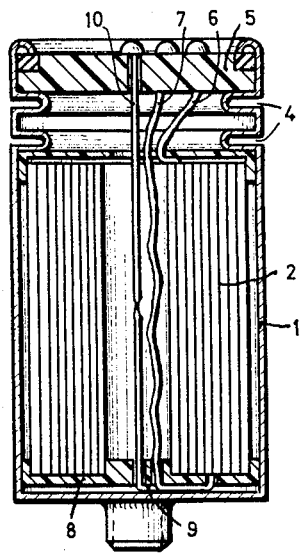
FIG. 6 is a sectional view, similar to FIGS. 1–4, wherein one side of the cutout element is operatively connected to one side of the capacitor and a common connecting lead is employed therewith.
Figure 8:
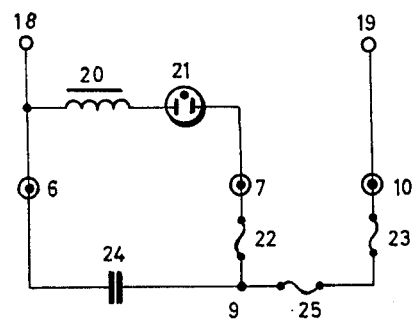
FIG. 8 is a diagrammatic figure of a circuit embodying a structure similar to that illustrated in FIG. 7.

FIG. 8 shows a circuit in which may be employed a capacitor in accordance with the invention, and in particular, a capacitor in accordance with the embodiments of FIGS. 6 and 7. A fluorescent tube 21 is utilized with a series connected choke 20 and parallel-connected capacitor 24, which are connected at the points 18 and 19 to the power supply line. The rupturable cutout element 23 is inserted in the connection to the power supply, being connected directly by its lead 10 with the power line connecting point 19, while its other lead is operatively connected at the point 9 with the capacitor 24. Corresponding to the showing in FIGS. 6 and 7, numerals 6, 7 and 10 designate the outer terminals at the cover of the capacitor housing. It may be desirable in some cases to dispose a rupturable cutout element in the lead between the points 9 and 7 as, for example, a rupturable cutout element 22. Likewise, if necessary, or desirable, a thermal cutout or fuse 25 can also be inserted in series with the rupturable cutout element 23 and disposed within the capacitor housing.

Modifications and changes may be made within the spirit and scope of the appended claims which define what is believed to be new and desired to have protected by Letters Patent.

I claim:

1. In an explosion-proof electrical capacitor and cutout, the combination of a capacitor housing in which is disposed a capacitor structure having connecting leads therefor, said housing having at least one corrugation in the longitudinally extending wall thereof, which corrugation extends transversely to the longitudinal axis of the housing to permit expansion of the housing without leakage upon an excess generation of gas within the housing, and an electrical conducting rupturable cutout element including a longitudinally extending portion spanning the corrugated portion of the housing and rupturable upon expansion of the housing, and a pair of connecting leads for said electrical cutout element, each of which is connected to a respective electrical side of said cutout element and brought out to a terminal disposed exteriorly of the housing 2. An explosion-proof electrical capacitor as defined in claim 1, comprising in further combination, means insulating said electrical cutout connecting leads from the connecting leads of the capacitor structure.

3. An explosion-proof electrical capacitor as defined in claim 1, wherein an electrical side of said cutout element is connected to one side of said capacitor structure, and a connecting lead from such connection forming the common lead for said connected sides of the capacitor and said cutout element, said common lead along with the respective connecting leads from the other electrical side of said cutout element and the other side of said capacitor structure being operatively brought out to terminals disposed exteriorly of the housing.

References Cited by the Examiner

UNITED STATES PATENTS

| 1,448,023 | 3/1923 | Wooldridge | 174—12 |
| 2,896,049 | 7/1959 | Maier | 200—113 |

FOREIGN PATENTS 1,298,073  5/1962  France.

JOHN F. BURNS, *Primary Examiner.*